Figure 1:
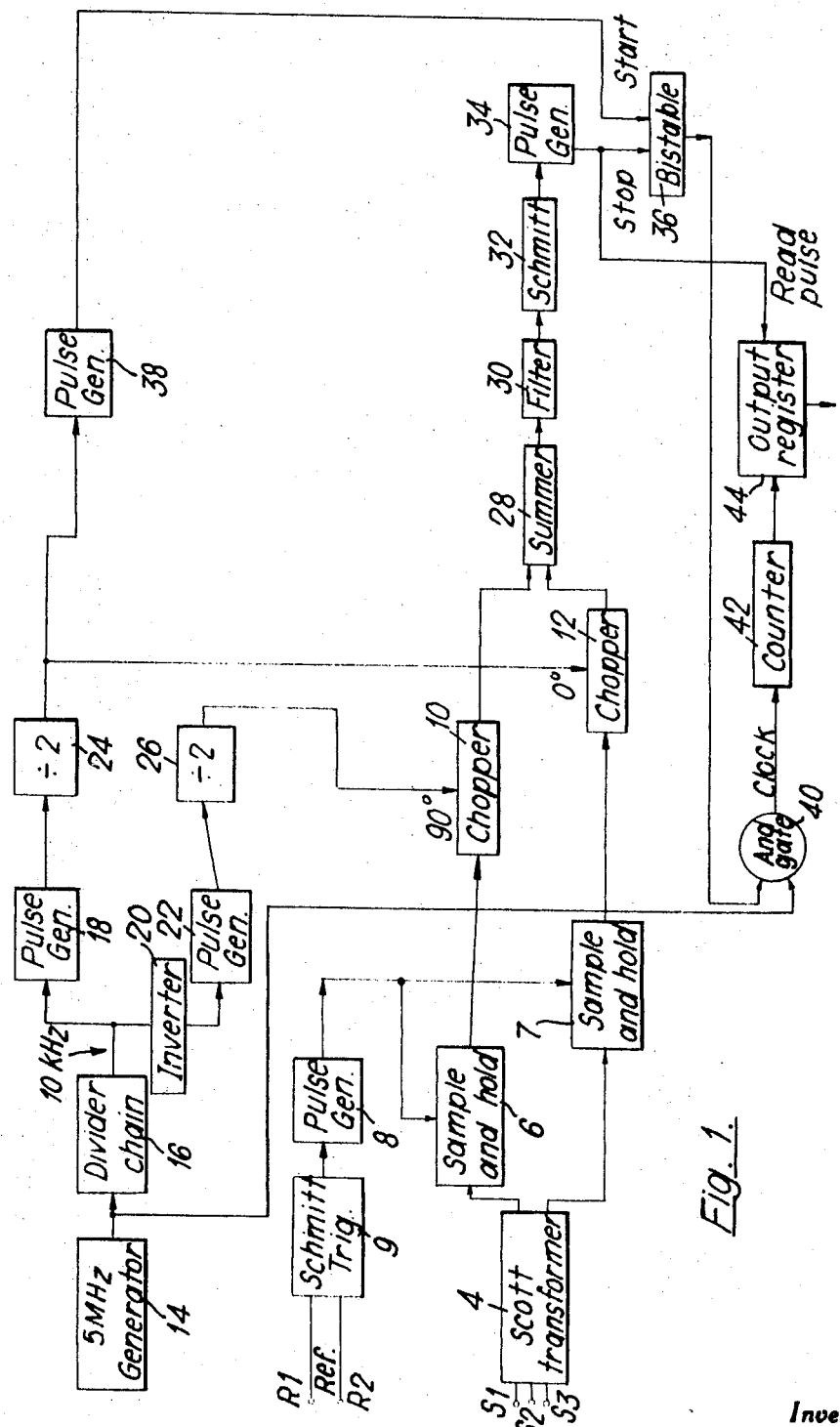

United States Patent

[11] 3,612,977

| [72] | Inventor | Brian Raymond Perrett<br>Radstock, England |
|---|---|---|
| [21] | Appl. No. | 86,476 |
| [22] | Filed | Nov. 3, 1970 |
| [45] | Patented | Oct. 12, 1971 |
| [73] | Assignee | British Aircraft Corporation Limited<br>London, England |
| [32] | Priority | Nov. 5, 1969 |
| [33] | | Great Britain |
| [31] | | 54304/69 |

[54] APPARATUS FOR SIGNALLING AN ANGULAR DISPLACEMENT OF A BODY ABOUT AN AXIS
8 Claims, 4 Drawing Figs.

[52] U.S. Cl. .................................................. 318/654, 318/661
[51] Int. Cl. .................................................. G05b 1/06
[50] Field of Search .......................................... 318/661, 654

[56] References Cited
UNITED STATES PATENTS
3,512,062   5/1970   Aoki .......................... 318/661 X

*Primary Examiner*—Benjamin Dobeck
*Attorney*—Kemon, Palmer & Estabrook

ABSTRACT: To provide an indication of the angular displacement $\Phi$ of the rotor of a synchro transmitter or resolver, two cyclically varying signals having amplitudes representing the sine and cosine respectively of the rotor shaft angle are derived and are used with two further cyclic signals, having a higher frequency $n$ and in phase quadrature, to derive two trains of pulses at the higher frequency in phase quadrature, the two-pulse trains having amplitudes representing respectively the sine and cosine of the shaft angle. These pulse trains are combined and processed to provide a signal which is a function of $(\omega nt+\Phi)$, which is then compared with a reference signal at frequency $n$ to obtain an indication of the rotor shaft angle $\Phi$.

Inventor
BRIAN R. PERRETT
By
Kemon, Palmer & Estabrook
Attorneys

APPARATUS FOR SIGNALLING AN ANGULAR DISPLACEMENT OF A BODY ABOUT AN AXIS

This invention relates to signalling the angular displacement of the rotor of a synchro transmitter or resolver about an axis.

According to the invention, we derive from the synchro transmitter or resolver two cyclic signals varying with ($\sin \Phi \sin \omega t$) and ($\cos \Phi \sin \omega t$), respectively, where $\Phi$ is the rotor shaft angle and $\omega$ the angular frequency of the supply voltage; we then derive from the first of these cyclic signals a first series of pulses which have a given frequency and an amplitude representing the peak level of the first cyclic signal and we derive from the second of the cyclic signals a second series of pulses which have the same given frequency and have an amplitude representing the peak level of the second cyclic signal, the second series of pulses being in phase quadrature with the first series of pulses; from the first and second series of pulses we obtain a signal which is a function of ($\omega nt + \Phi$), where $n$ is the said pulse frequency and we compare the said function signal with a reference phase signal at the frequency $n$ to obtain an indication of the rotor shaft angle $\Phi$.

In our preferred form of apparatus for carrying this method into effect, we include sample-and-hold circuits for periodically sampling each of the two cyclic signals at corresponding points in different cycles of the signal and holding the sampled signal levels, and means for chopping the two signal samples respectively with two equal-frequency quadrature-phase signals. It is advantageous to use a high-frequency pulse generator and a divider to obtain the quadrature-phase chopping signals and this pulse generator may also be used with a counter and a gate controlled by the comparator output to obtain a digital representation of the rotor shaft angle.

The invention has a particularly advantageous application in aircraft, where a remote indication of the angular positions of many indicators is required and where it is desirable for these to be processed by a single resolving system. Apparatus embodying the present invention may be constructed to permit many synchro transmitters to be multiplexed into a single electronic resolving apparatus. The use of digital techniques to effect phase shifting, for generating the phase quadrature signals, enables very high speeds to be achieved. A single apparatus embodying the invention may be used to process many synchro output signals and in such a case the time required for unwanted transient signals to decay and for the resolver to settle to give a true measure of angular position, is very important. It determines the rate at which one set of synchro outputs can be processed and then switched out to allow another set of synchro signals to be introduced. As an example, the invention can be utilized in aircraft accident-recording equipment.

In the preferred form of apparatus embodying the invention, a Scott transformer is used to generate a first signal proportional to the difference in amplitude between two of the output phases of the stator, this signal being a function of the sine of the rotor angle and the sine of the rotor input voltage phase angle, and to generate a second signal from the third output phase of the synchro, the second signal being a function of the cosine of the rotor angle and the sine of the rotor input voltage phase angle.

Figure 2:
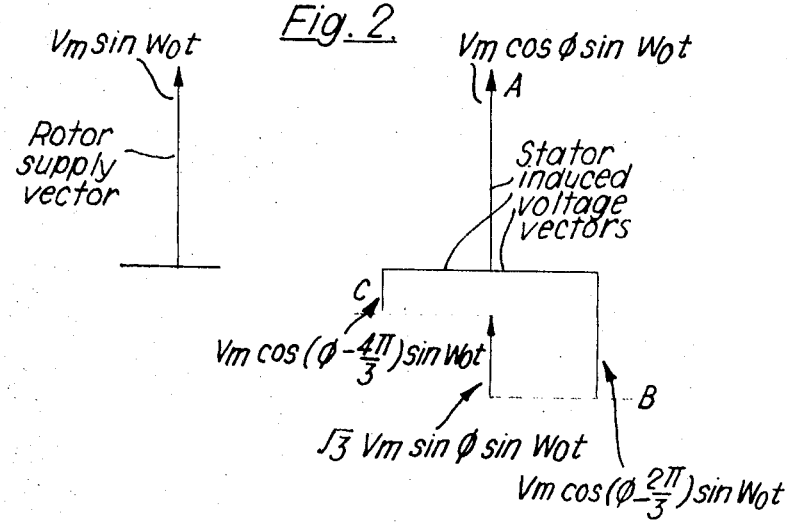
Figure 3:
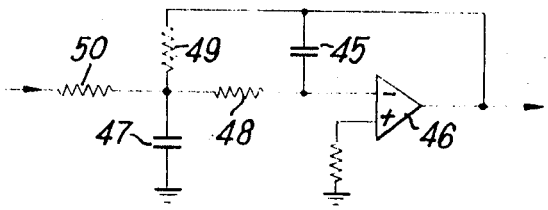
Figure 4:
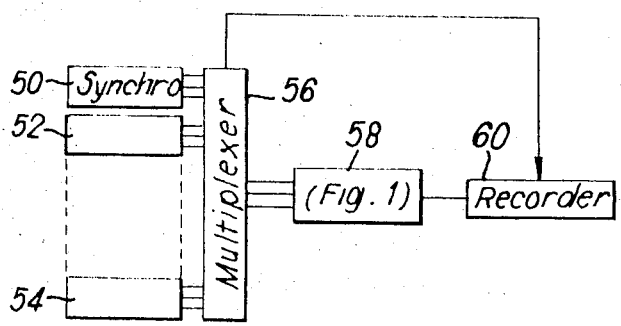

In order that the invention may be better understood, one example will now be described with reference to the accompanying drawings, in which:

FIG. 1 is a block circuit diagram of the apparatus;
FIG. 2 is a vector diagram of the synchro output;
FIG. 3 shows one half of a low-pass filter used in the circuit of FIG. 1; and,
FIG. 4 shows diagrammatically an arrangement utilizing the invention in apparatus for recording the variations of the angular positions of a number of shafts.

Referring to FIG. 1, the three stator signals S1, S2 and S3 (see FIG. 2) are applied to a Scott-connected transformer 4. Such a transformer produces one output corresponding to the A vector of FIG. 2 and a second output proportional to the difference between the B and C vectors of FIG. 2. These two output signals are applied to sample-and-hold circuits 6 and 7. These derive their sampling control signals from a pulse generator 8 fed from a Schmitt trigger circuit 9 in turn supplied with reference signals from the terminals R1 and R2. When the reference signal is at or near its maximum value, the pulse generator causes the circuits 6 and 7 to strobe and store the instantaneous values of their input signals. The signal samples from the circuits 6 and 7 are DC voltages whose amplitudes are respectively relates to ($\cos \Phi \sin \omega t$) and ($\sin \Phi \sin \omega t$), where $\Phi$ is the rotor shaft angle and $\omega$ is the angular frequency of the rotor supply. Thus, the amplitudes of the signal samples are steady and have a ratio one to the other of $\cos \Phi$ to $\sin \Phi$. The signal samples are then applied to chopper circuits 10 and 12.

The derivation of the chopper signals will now be explained. A high-frequency generator 14 generates a 5 MHz signal and applies it to a divider chain 16, the output of which is a train of pulses at a frequency of 10 kHz. These pulses are applied directly to a first pulse generator 18 and through an inverter 20 to a second pulse generator 22. The signal at the outputs of the pulse generators 18 and 22 are thus in phase opposition. These two signals are applied to single-stage binary dividers 24 and 26 respectively, the outputs of which are 5 kHz. signals in phase quadrature, that is to say with a phase difference of 90°. These are the signals which are applied to the choppers 10 and 12 to chop the signal samples at the rate of 5 kHz. At the outputs of the chopper circuits 10 and 12 there are 5 kHz. square waveforms having a unity mark-space ratio. These waveforms are amplitude modulated according to the sampled amplitudes from the circuits 6 and 7 that is to say according to $V_m \sin \Phi$ and $V_m \cos \Phi$; they are inherently in phase quadrature by virtue of the phase relationship of the chopping signals.

Analysis of these two 5 kHz. square waveforms will show therefore that their fundamental components can be expressed mathematically as $$V_m \sin \Phi \sin \omega nt \text{ and}$$
$$V_m \cos \Phi \cos \omega nt, \text{ where } n \text{ is the chopping frequency.}$$

The terms $\sin \omega nt$ and $\cos \omega nt$ occur because the fundamental components of the switching waveforms are $\sin \omega nt$ and $\cos \omega nt$, due to 90° quadrature which exists in the digitally derived switch waveforms. The chopped signals are applied to a summing amplifier 28.

When the two quadrature-phase, amplitude-modulated square waveforms are summed the resulting signal has a fundamental component which is the summation of the two fundamentals of the input square waveforms to the summing amplifier, i.e. the output of the latter has a fundamental component which can be described mathematically as $$V_m \sin (\omega nt + \Phi).$$

The output of the summing amplifier passes through a low-pass filter 30, having an upper frequency limit just above kHz., 5 kHz. which extracts this fundamental component.

The fundamental component of the basic switching waveform is $$V_m \sin \omega nt.$$

Consequently, it is possible to derive from these waveforms two-pulse trains which can be used respectively to start and stop a counter which counts the 5 MHz clock pulses, and thus to establish a count proportional to $\Phi$, that is to say proportional to the rotor angle.

To make this comparison between the two fundamental waveforms, the output of the filter 30 is applied to a zero-crossing Schmitt trigger circuit 32. The trigger output controls a pulse generator 34 which in turn supplies one side of a bistable circuit 36. The switching or chopping reference signal is applied to the other side of the bistable circuit and is obtained from a pulse generator 38 fed with the 5 MHz output of the circuit 24. This signal consists of short pulses of square waveform at a 5 MHz repetition frequency.

The pulse generated by the bistable circuit has a duration varying with the rotor angle $\Phi$. This signal controls an AND gate 40, the other input of which receives 5 MHz pulses from the high-frequency generator 14. The gated high-frequency pulses feed a counter 42, the reading of which passes to an output register 44.

The circuit 30 includes two series-connected low-pass filters of the kind shown in FIG. 3. The filter includes a differential amplifier 46 and for 400 Hz. operation the values of the components are: capacitor 45 —0.0047 µf; capacitor 47 —0.047 µf.; resistor 48 —15 KΩ; resistors 49 and 50 —45 KΩ; and resistor 51 —37.5 KΩ. This filter has a very small settling time. Two such filters are used in series because a single filter has a limited rolloff.

In FIG. 4 a number of synchro transmitters 50, 52 and 54 are connected to a multiplexer 56 which connects each synchro transmitter in turn to a block 58 representing the apparatus of FIG. 1. The output of the apparatus FIG. 1 goes to a recorder 60, the operation of which is synchronized with the selection of the synchro transmitters by a signal from the multiplexer 56 over the line 62.

The apparatus described enables high reading speeds to be achieved. The use of digital techniques to produce a 90° phase shift plays a large part in obtaining this high speed. The high-speed clock and the divider chain run continuously. Consequently, when one synchro is switched out and the next is switched in, the phase-shifting circuits do not require time to settle, as analogue phase-shifting circuits would. The settling time of the system is determined by the low-pass filter which extracts the fundamental of the chopped reference signal and the summing amplifier output; this is less than 20 cycles of the chopper frequency, which for a chopper frequency of 5 kc./s. is less than 4 msecs. After switching in a new synchro source, the counting is inhibited for 4 msecs. to allow such settling. The inhibition can be effected by a monostable circuit triggered either when the multiplexer switches to a new input or when the sample-and-hold circuits are updated. When this inhibition is removed, a count proportional to the angle is available not more than 0.5 msecs. later. The count can then be read out of the register and it is updated every 200 msecs. until a new synchro is applied.

The circuits can conveniently be arranged on printed circuit plug-in cards.

In addition, the apparatus as described provides a very high level of accuracy even in face of considerable variation in the amplitude of the signal which energizes the rotor winding of the synchro, or ±10 percent variation in the supply frequency to the rotor winding of the synchro, or 10 percent harmonic distortion of the rotor supply frequency.

I claim:

1. A method of signalling the angular displacement of the rotor of a synchro transmitter or resolver about an axis, comprising the steps of:

deriving from the synchro transmitter or resolver first and second cyclic signals varying with (sin $\Phi$ sin $\omega t$) and (cos $\Phi$ sin $\omega t$) respectively, where $\Phi$ is the rotor shaft angle and $\omega$ the angular frequency of the supply voltage;

deriving from the first signal a first series of pulses which have a given frequency greater than that of the supply voltage and an amplitude representing the peak amplitude of the first cyclic signal;

deriving from the second cyclic signal a second series of pulses which have the said given frequency and an amplitude representing the peak value of the second cyclic signal, the second series of pulses being in phase quadrature with the first series;

deriving from the first and second series of pulses a signal which is a function of ($\omega nt+\Phi$), where $n$ is the said pulse frequency;

and comparing the signal which is a function of ($\omega nt+\Phi$) with a reference phase signal at the frequency $n$ to obtain an indication of the rotor shaft angle $\Phi$.

2. A method of signalling the angular displacement of the rotor of a synchro transmitter or resolver about an axis, comprising the steps of:

deriving from the synchro transmitter or resolver first and second cyclic signals varying with (sin $\Phi$ sin $\omega t$) and (cos $\Phi$ sin $\omega t$) respectively, where $\Phi$ is the rotor shaft angle and $\omega$ the angular frequency of the supply voltage;

sampling each of the first and second signals at corresponding points in different cycles of the signal;

deriving for each first signal sample a first series of pulses which have a given frequency and an amplitude representing the first signal sample level;

deriving for each second signal sample a second series of pulses at the said given frequency and having an amplitude representative of the second signal sample level, the second series of pulses being in phase quadrature with the first series;

combining the first and second series of pulses and deriving from the combination a signal which is a function of ($\omega nt+\Phi$), where $n$ is the said pulse frequency;

and comparing the signal which is a function of ($\omega nt+\Phi$) with a reference phase signal at the frequency $n$ to obtain an indication of the rotor shaft angle $\Phi$.

3. Apparatus for signalling the angular displacement of the rotor of a synchro transmitter or resolver about an axis, comprising:

means for deriving from the synchro transmitter or resolver two cyclic signals varying with (sin $\Phi$ sin $\omega t$) and (cos $\Phi$ sin $\omega t$), respectively, where $\Phi$ is the rotor shaft angle and $\omega$ the angular frequency of the supply voltage;

first signal-processing means for deriving from the first cyclic signal a first series of pulses which have a given frequency and an amplitude equal to the peak value of the first cyclic signal;

second signal-processing means for deriving from the second cyclic signal a second series of pulses which have the said given frequency and an amplitude equal to the peak value of the second cyclic signal, the second series of pulses being in phase quadrature with the first series of pulses;

third signal-processing means for combining the first and second series of pulses and deriving from the combination a signal which is a function of ($\omega nt+\Phi$), where $n$ is the said pulse frequency, and means for comparing the signal which is a function of ($\omega nt+\Phi$) with a reference phase signal at the frequency $n$ to obtain an indication of the rotor shaft angle $\Phi$.

4. Apparatus for signalling the angular displacement of the rotor of a synchro transmitter or resolver about an axis, comprising:

means for deriving from the synchro transmitter or resolver two cyclic signals varying with (sin $\Phi$ sin $\omega t$) and (cos $\Phi$ sin $\omega t$) respectively, where $\Phi$ is the rotor shaft angle and $\omega$ the angular frequency of the supply voltage;

sample-and-hold circuits for periodically sampling each of these signals at corresponding points in different cycles of the signal and holding the sampled signal levels;

means for deriving two periodic signals at equal frequency in quadrature phase relationship;

chopping means for chopping the two samples signals respectively with the said two quadrature-phase signals;

signal-processing means for combining the chopped signals and deriving therefrom a signal which is a function of ($\omega nt+\Phi$), where $n$ is the frequency of the chopping signals, a comparator connected to receive and compare the signal which is a function of ($\omega nt+\Phi$) with a reference phase signal at the chopping frequency;

and means responsive to the result of the comparison to provide a digital representation of the rotor shaft angle.

5. Apparatus in accordance with claim 4, in which the means for deriving two periodic signals at equal frequency in quadrature-phase relationship includes a high-frequency pulse generator and frequency dividing means.

6. Apparatus in accordance with claim 5, in which the means for providing a digital representation of the rotor shaft angle includes the said high-frequency pulse generator, a counter and a gate responsive to the result of the comparison to control the interval for which pulses from the generator are applied to the counter.

7. Apparatus in accordance with claim 3, in which the means for deriving the two cyclic signals includes a Scott transformer.

8. Data indicating or recording equipment including apparatus in accordance with claim 3 together with multiplexing means for successively connecting different synchro transmitters or resolvers to the said apparatus.